July 16, 1968 L. L. FRY Re. 26,425

PLANT THINNER

Original Filed Sept. 3, 1963

INVENTOR.
LYLE L. FRY
BY
ATTORNEY

United States Patent Office

Re. 26,425
Reissued July 16, 1968

26,425
PLANT THINNER

Lyle L. Fry, Rte. 1, Box 6,
Gering, Nebr. 69341

Original No. 3,146,832, dated Sept. 1, 1964, Ser. No. 306,052, Sept. 3, 1963. Application for reissue May 12, 1965, Ser. No. 457,907
3 Claims. (Cl. 172—59)

Matter enclosed in heavy brackets [ ] appears in the original patent but forms no part of this reissue specification; matter printed in italics indicates the additions made by reissue.

*ABSTRACT OF THE DISCLOSURE*

*A wheeled vehicle having motivating means attached thereto for moving the vehicle across the ground. An arm pivotally attached to the frame of the vehicle, movable between an upper and lower position and biased in the upper position by a spring. Plant thinning fingers rotatably attached adjacent the forward end of the arm and adapted to engage the earth when the arm is in the lower position. Means attached to the plant thinning fingers and the motivating means for causing the thinning fingers to oscillate about a substantially vertical axis.*

This invention relates to an implement to be driven along rows of seed-planted crops; such as, sugar beets, for thinning out the sprouting seeds to leave separated plants to mature. Conventional thinning or blocking implements have not been wholly satisfactory for this purpose. Such devices are conventionally designed to remove the plants from the row at uniformly spaced intervals leaving spaced-apart growing plants or groups of plants. Since the rows do not sprout uniformly throughout their entire lengths, this often results in removing already spaced plants leaving intervals where no seeds are sprouting.

The principal object of this invention is to provide a highly efficient, self-propelled, multi-row, plant thinning implement which will have the conventional, uniform thinning characteristics but which in addition will enable the operator to selectively discontinue the thinning at points along the rows where thinning is undesirable without interference with the uniform advancement of the implement along the rows.

Another object of the invention is to provide an implement with the above characteristics which will be relatively small and light in weight so that it may be easily picked up and transported from place to place and to provide an implement which will be economical to manufacture and use.

Other objects and advantages reside in the detail construction of the invention, which is designed for simplicity, economy, and efficiency. These will become more apparent from the following description.

In the following detailed description of the invention, reference is made to the accompanying drawing which forms a part hereof. Like numerals refer to like parts in all views of the drawing and throughout the description.

Figure 1:
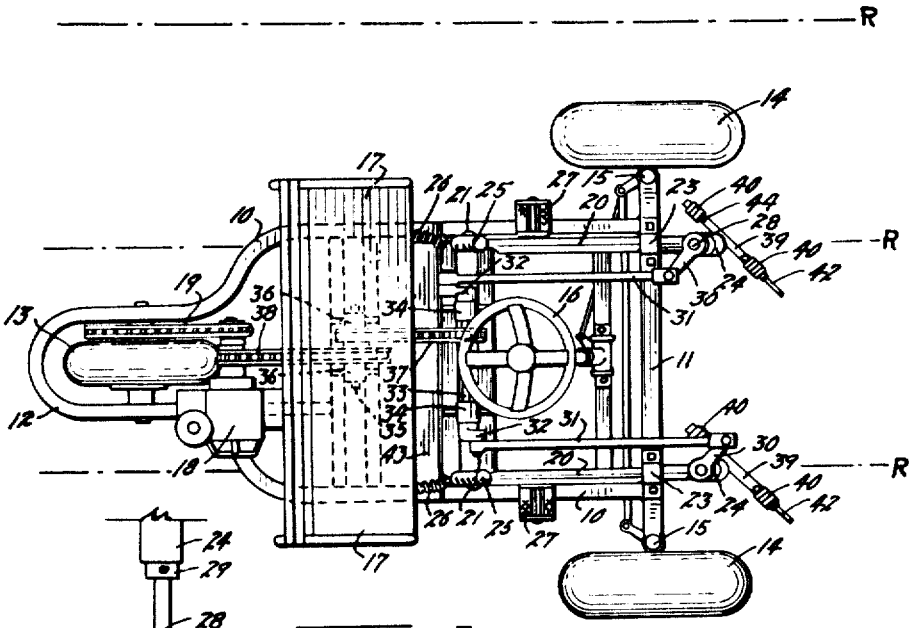
FIG. 1 is a top plan view of the selective plant thinning implement of this invention.
Figure 3:
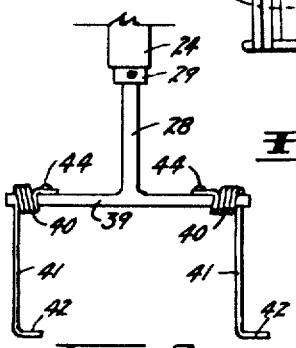
FIG. 3 is a fragmentary, enlarged detail view of a plant thinning element as used on this implement.

The center lines of conventional uniformly-spaced, plant rows are indicated in FIG. 1 by the horizontal dash-dot lines R.

The elements of the invention are mounted on a rigid frame or chassis 10 terminating at its forward extremity in a front axle 11 and at its rear extremity in a U-shaped bend 12.

A rear drive wheel 13 is rotatably mounted in the rear U-shaped bend 12 and a front steerable wheel 14 is mounted on a steering spindle 15 at each extremity of the front axle 11. The spindles 15 are adapted to be rotated in unison for steering purposes from a steering wheel 16 by conventional automotive steering equipment. For two row operation, for which the implement is primarily designed, the front wheels 14 are spaced apart a two-row distance and the rear wheel 13 travels an intermediate path. A relatively wide operator's seat 17 is supported above, and extends completely across, the chassis 10 rearwardly of the steering wheel 14. A floor plate 43 is positioned forwardly of the seat 17.

The implement is driven from an engine 18 mounted on the chassis 10 adjacent the rear wheel 13. The engine is relatively small and is preferably of an economical type such as used for propelling golf carts, lawn mowers and the like. The engine is connected to the rear drive wheel through a suitable power transmission mechanism such as a first transmission chain 19.

As thus far described, the implement comprises a three wheeled steerable vehicle having a rear drive wheel travelling between two plant rows and two front wheels travelling on each side of said two rows.

The selective thinning mechanism is mounted on the chassis 10 and is as follows:

A lift lever 20 is hingedly mounted on a hinge pin 21 in a supporting hinge bracket 22 positioned forwardly of the seat 17 and at each side of the chassis 10. Each lift lever is positioned to ride directly over one of the plant rows R. The lift levers extend forwardly through inverted-U-shaped guides 23, mounted on the front axle 11, which guide and limit their movements in vertical planes. A bearing sleeve 24 is mounted on the forward extremity of each lift lever forwardly of the front axle 11. The bearing sleeves 24 lie in the planes of the rows R and are preferably inclined rearwardly at their upper extremities.

A lift handle 25 is mounted, or formed on, the rear extremity of each lift lever and extends upwardly in front of the operator's seat 17. A tension spring 26 is tensioned between each lift handle 25 and the chassis 10 to constantly urge each lift lever upwardly to the limit of the guide 23. A foot pedal 27, such as a bicycle-type pedal, is mounted on and projects outwardly from each of the lift levers 20.

An oscillating thinner shaft 28 is axially and rotatably mounted in each bearing sleeve 24, between adjustable set nuts 29, and projects both upwardly and downwardly therefrom. The upper extremity of each thinner shaft terminates in a driven crank 30 connected, by means of a suitable connecting rod 31, to a drive crank 32 on a crank-shaft 33. The crank-shaft 33 is rotatably mounted in upstanding bearing brackets 34 supported from the chassis 10. The drive cranks 32 are shorter than the driven cranks 30, the relation being such that when the drive cranks rotate 360° the driven cranks will be oscillated back and forth through an arc of 90°.

The crank-shaft 33 is driven from the motor 18 through any suitable power transmission mechanism. As illustrated, the crank-shaft is driven at reduced speed from a counter-shaft 35, journalled transversally of the chassis 10 in suitable bearing supports 36 positioned intermediate the crank-shaft and the engine. Power is transmitted from the counter-shaft 35 to the crank-shaft 33 through a second transmission chain 37 and from the engine to the counter-shaft through a third transmission chain 38. Thus, it can be seen that during forward travel, the engine oscillates the thinner shafts 28 back and forth so that the levers 30 swing forward and back from the position shown in FIG. 1 through an arc of 90°.

Figure 2:
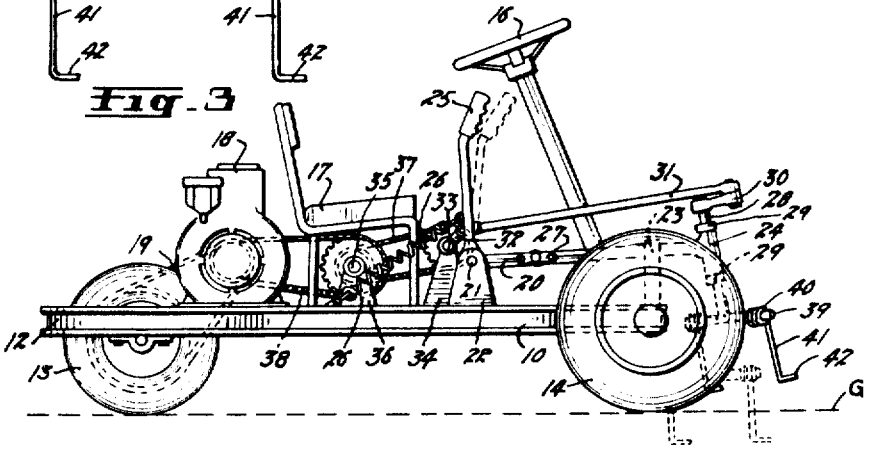
FIG. 2 is a side elevational view thereof.

A transversally positioned foot bar 39 is formed, or mounted on, the lower extremity of each thinner shaft 28 forming an inverted T with oppositely projecting arms. A resiliently flexible spring wire is secured at its one extremity to each arm of each foot bar 39, as indicated at 44, and is coiled thereabout to form a spring coil 40 thereon. The other extremity of each spring wire projects from the coil at an angle of 90° to the foot bar and extends straight downwardly to form a flexible tine 41 terminating in a relatively short, horizontal, foot portion 42 extending at right angles to the tine 41 and lying in the plane of the foot bar. The length of the thinner shafts 28 are such that the foot portions 42 will be positioned above the ground level, indicated at G in FIG. 2, when the lift levers 20 are in their uppermost position, and will enter into the ground when the lift levers are in their lowermost position, as indicated in broken line in FIG. 2. In the latter position, the resilient foot portions 42 will swing back and forth through the rows of plants, as the implement travels forwardly, removing spaced-apart sections of plants from the rows of plants and leaving spaced-apart groups of growing plants.

It is believed the operation of the implement will be apparent from the above. Briefly, two operators are seated side-by-side on the seat 17, each with one of the lift handles 25 between his legs. The outer foot of each operator is positioned on one of the pedals 27. The inner feet are positioned on the floor plate 43. Each operator grasps the lift handle in front of him with one hand and one, or both, the operators grasp the steering wheel 16 in the other hand. The implement is guided down the row by maintaining the thinner shafts 28 in alignment with the rows of plants and with the lift handles normally pushed forwardly and the pedals 27 pushed downwardly. When either operator sees the thinning mechanism approaching a sparcely growing portion of a row of plants, he pulls his lift handle 25 rearwardly to swing the lift lever 20 upwardly to lift the spring arms 41 and the foot portions 42 from the ground so as to not accidentally remove already-spaced plants from the row. When a normally growing portion of the row is reached, the lift handle is pushed forwardly to restore the normal thinning operation.

The lift levers can, of course, be pushed downwardly with the pedals 27 if both the operator's hands are occupied in steering and the springs will lift the thinning tines from the ground without resort to the lift handles 25. It has been found much more restful, however, to use both the hands and the feet with the assistance of the springs in lifting the lift levers and their attached mechanism.

While the invention has been described as a self-propelled implement, it could, of course, be hitched to a draft vehicle to be drawn along the plant rows. For instance, it could be mounted on the tool bar of another implement or upon the tool bar of a conventional tractor or on a vegetable bedshaper. As illustrated, the manual movements are directly transmitted to raise and lower the plant thinning means. These manual movements could be hydraulically or electrically transmitted to the lift levers if preferred.

The implement illustrated, is a two-row thinner. It is of course, understood that the implement could be manufactured for use on a single row by eliminating one of the lift levers and its attached thinning elements or for any desired number of additional rows by increasing the number of lift levers and their attached thinning elements.

While a specific form of the invention has been described and illustrated herein, it is to be understood that the same may be varied within the scope of the appended claim, without departing from the spirit of the invention.

Having thus described the invention, what is claimed and desired to be secured by Letters Patent is:

*1.* A plant thinning implement comprising in combination, a three-wheeled frame having a wide front portion and a reduced narrow rear portion, a front axle, a pair of transversely aligned steerable wheels carried by the front axle, a single wheel carried by the rear portion of said frame, a dual operator's seat mounted at the rear of the wide portion, a central steering wheel adjacent said seat, an operating connection between said steering wheel and said steerable front wheels, a motor mounted at the rear of the frame, a driving connection between said motor and said single rear wheel, a U-shaped guide mounted on each side of said axle, a bracket mounted on and extending above said frame on each side of said frame, a lift lever pivotally mounted at one end in each bracket and resting in one of said U-shaped guides for limited vertical movement relative to said frame, a substantially vertical sleeve at the other end of each lever, a rotatable thinner shaft in each sleeve, a foot bar at the lower end of each thinner shaft, spring thinner fingers carried by said foot bar, means operatively connecting said thinner shafts to said motor for oscillation of said shafts, a foot pedal on each lift lever extending outwardly relative to the longitudinal axis of the frame, a lift handle fixedly connected to said one end of each lift lever and extending upwardly at substantially right angles thereto, and a pair of heavy duty tension springs each secured at one end to said frame beneath said seat, one on each side of the frame, and at its other end to an intermediate portion of the adjacent lift handle.

*2. A plant thinning implement comprising in combination:*

*(a) a frame;*

*(b) wheel means comprising at least three supporting wheels attached to said frame;*

*(c) at least one of said wheels comprising steerable wheel means;*

*(d) an operator's seat mounted on said frame;*

*(e) steering means adjacent said operator's seat and operatively attached to said steerable wheel means;*

*(f) a motor mounted on said frame;*

*(g) a driving connection between at least one of said wheels and said motor;*

*(h) a manually shiftable lift lever provided with pedal means for optional hand or foot manipulation;*

*(i) means pivotally mounting said lever adjacent one end thereof on said frame for limited vertical movement of the other end of said lever relative to said frame;*

*(j) a support bar having thinner fingers mounted substantially perpendicular thereto in a spaced apart relationship;*

*(k) means rotatably mounting said support bar in a substantially horizontal position adjacent said other end of said lever for rotation about a substantially vertical axis;*

*(l) oscillatory means connected to said support bar for imparting oscillatory movement to said support bar when rotary motion is applied to said oscillatory means;*

*(m) the limited vertical movement of said other end of said lift lever being sufficient for vertically raising or lowering said other end thereof until said thinner fingers are disengaged or engaged with the earth, respectively; and*

*(n) spring means secured to said frame and normally biasing said lift lever in a vertically raised position.*

*3. A plant thinning implement comprising in combination:*

*(a) a frame having three supporting wheels attached thereto at least one of which is mounted for steering;*

*(b) an operator's seat mounted on said frame;*

*(c) steering means adjacent said operator's seat and operatively attached to said one wheel;*

*(d) a motor mounted on said frame;*

*(e) a driving connection between at least one of said wheels and said motor;*

*(f) a pair of manually shiftable lift levers each being provided with pedal means for optional hand or foot manipulation;*

(*g*) *means pivotally mounting each of said levers adjament one end thereof on said frame in a horizontally spaced apart relationship for limited vertical movement of the other ends of said levers relative to said frame;*

(*h*) *a pair of support bars having thinner fingers mounted on each bar substantially perpendicular thereto in a spaced apart relationship;*

(*i*) *means rotatably mounting said support bars in substantially horizontal positions adjacent said other ends of said levers for rotation about substantially vertical axes;*

(*j*) *oscillatory means operatively connecting each of said support bars to said motor for imparting oscillatory movement to said support bars;*

(*k*) *means fixedly attached to said lift levers for vertically raising or lowering individually said other ends thereof until said thinner fingers are disengaged or engaged with the earth respectively; and*

(*l*) *spring means secured to said frame and normally biasing said lift levers in a vertically raised position.*

References Cited

The following references, cited by the Examiner, are of record in the patented file of this patent or the original patent.

UNITED STATES PATENTS

| | | |
|---|---|---|
| 270,824 | 1/1883 | Michaelis. |
| 1,113,806 | 10/1914 | Meidenbauer. |
| 1,225,204 | 5/1917 | Anderson. |
| 2,053,618 | 9/1936 | Lengendre. |
| 2,764,922 | 10/1956 | Carnall. |

FOREIGN PATENTS

| | | |
|---|---|---|
| 967,149 | 3/1950 | France. |
| 1,047,289 | 7/1953 | France. |
| 1,201,255 | 7/1959 | France. |
| 897,496 | 11/1953 | Germany. |
| 1,018,572 | 10/1952 | France. |

ABRAHAM G. STONE, *Primary Examiner.*

A. E. KOPECKI, *Assistant Examiner.*